United States Patent
Nam

(10) Patent No.: US 7,587,891 B2
(45) Date of Patent: Sep. 15, 2009

(54) METHOD FOR REGENERATING NOX ABSORBING CATALYST

(75) Inventor: Gun Woo Nam, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 260 days.

(21) Appl. No.: 11/529,459

(22) Filed: Sep. 27, 2006

(65) Prior Publication Data
US 2007/0130920 A1    Jun. 14, 2007

(30) Foreign Application Priority Data
Dec. 12, 2005    (KR) ............... 10-2005-0122000

(51) Int. Cl.
*F01N 3/00*    (2006.01)
*F01N 3/10*    (2006.01)

(52) U.S. Cl. ............... 60/286; 60/276; 60/295

(58) Field of Classification Search ............... 60/286, 60/295, 301, 303, 276
See application file for complete search history.

(56) References Cited

U.S. PATENT DOCUMENTS 6,615,577 B2 * 9/2003 Meyer et al. ............... 60/276

2004/0250531 A1 * 12/2004 Palma et al. ............... 60/277
2005/0144934 A1 * 7/2005 Nakatsuji et al. ............... 60/295

* cited by examiner

*Primary Examiner*—Thomas E Denion
*Assistant Examiner*—Jonathan Matthias
(74) *Attorney, Agent, or Firm*—Morgan, Lewis & Bockius LLP

(57) ABSTRACT

A method for regenerating a NOx absorbing catalyst includes: detecting a NOx value by a NOx sensor and determining whether to perform a regeneration mode or not based on a comparison of the sensed value and a predetermined upper limit; performing a first regeneration mode for a predetermined time period; if it is determined that the regeneration mode needs to be performed, determining a time period T2 for performing a second regeneration mode and performing the second regeneration mode for the determined time period T2; determining whether to perform a poisoning recovery mode based on the determination of whether a performance of the NOx absorbing catalyst has been deteriorated using an amount of exhausted NOx sensed after the performing of the second regeneration mode; and performing the poisoning recovery mode if it is determined that the poisoning recovery mode needs to be performed.

1 Claim, 4 Drawing Sheets

METHOD FOR REGENERATING NOX ABSORBING CATALYST

CROSS-REFERENCE TO RELATED APPLICATION

This application claims priority to Korean Patent Application No. 10-2005-0122000 filed in the Korean Intellectual Property Office on Dec. 12, 2005, the disclosures of which are incorporated herein by reference.

BACKGROUND OF THE INVENTION (a) Field of the Invention

The present invention relates to a method for regenerating a NOx absorbing catalyst. Particularly, the present invention is directed to a method for regenerating a NOx absorbing catalyst and recovering poisoning of the NOx absorbing catalyst thereby limiting an amount of exhausted NOx within a constant range by the NOx absorbing catalyst.

(b) Description of the Related Art

In a diesel engine vehicle, exhaust gas includes great quantities of minute particulate matters (PM), nitrogen oxides (NOx), etc. Various methods are used to reduce such PM, NOx, etc.

As such methods, the NOx PM reduction system ("NPRS") reduces PM and NOx at the same time using a diesel particulate matter filter ("DPF") and a lean NOx trap ("LNT").

The DPF physically collects particulate matters in the exhaust gas of a diesel engine using a trap that removes the collected particulate matters by heating the particulate matters above the oxidizing temperature which is between 600° C. to 650° C. The rate of PM collection is more than about 70%.

The NOx absorbing catalyst is an exhaust gas purification catalyst which purifies nitrogen oxides in exhaust gas. The NOx absorbing catalyst absorbs nitrogen oxides passing through, and performs an exhaust gas purification function by converting the absorbed nitrogen oxides to nitrogen ($N_2$). Accordingly, appropriate regeneration must be performed for continuous purification function of the NOx absorbing catalyst.

Meanwhile, the exhaust gas also includes sulfur oxide (Sox) in addition to NOx. The NOx absorbing catalyst absorbs not only nitrogen oxide but also sulfur components. If sulfur components are accumulated in the NOx absorbing catalyst, the method of purifying nitrogen oxides of the NOx absorbing catalyst is deteriorated. In order to solve this problem, a recovery of poisoning of the NOx absorbing catalyst of sulfur must be performed.

As such, in order to maintain the original function of the NOx absorbing catalyst, a regeneration method for performing a regeneration mode for NOx reduction and a poisoning recovery becomes important.

One example involves a technology adopting two NOx sensors upstream and downstream of the NOx absorbing catalyst. In this method, if the sensed or detected values of NOx of the two sensors are equal to each other, a regeneration mode is performed for a constant period so as to regenerate the NOx absorbing catalyst. However, this method has a drawback in that the precise control of an amount of exhausted NOx is impossible since the regeneration is performed only when the NOx absorbing catalyst excessively absorbs NOx. In addition, this method has a limitation that the sulfur poisoning cannot be exactly determined and the recovery of the poisoning is only periodic.

Accordingly, a method for suitably performing the regeneration mode and the poisoning recovery mode in order to obtain the original purification function of the NOx absorbing catalyst is necessary.

SUMMARY OF THE INVENTION

The present invention provides a method for regenerating a NOx absorbing catalyst by limiting an amount of exhausted NOx within an allowable range.

An exemplary embodiment of the present invention provides a method for regenerating a NOx absorbing catalyst including: sensing or detecting a NOx value in exhaust gas by a NOx sensor, determining whether to perform a regeneration mode or not based on a comparison of the sensed value and a predetermined upper limit; performing a first regeneration mode for a predetermined time period T1 if it is determined that the regeneration mode needs to be performed; determining a time period T2 for performing a second regeneration mode after performing the first regeneration mode, performing the second regeneration mode for the determined time period T2; determining whether to perform a poisoning recovery mode based on a determination of whether a performance of the NOx absorbing catalyst has deteriorated using an amount of exhausted NOx sensed or detected after the performing of the second regeneration mode; and performing the poisoning recovery mode if it is determined that the poisoning recovery mode needs to be performed.

The time period T2 may be determined based on the predetermined time period T1 and the difference between amounts of exhausted NOx by the performing the first regeneration mode.

The time period T2 may be determined as shown in the following equation:

$$T2 = T1*(b-FL)/(a-b)$$

where a is an initial sensed or detected value of NOx, b is a sensed or detected value of NOx after performing the first regeneration, T1 is the predetermined time period, and FL is a predetermined fresh level.

The decision whether to perform the poisoning recovery mode or not is determined by the difference between a NOx value sensed after the performing of the second regeneration mode and a predetermined fresh level, which is an intended criterion as a result of the performing of the regeneration mode, is greater than a predetermined value SPL and thereby determines whether a performance of the NOx absorbing catalyst has been deteriorated.

According to another embodiment of the present invention, a method for regenerating a NOx absorbing catalyst includes: sensing or detecting a NOx value by a NOx sensor; determining whether to perform a regeneration mode based on a comparison of the sensed or detected value and a predetermined upper limit (UL); performing a first regeneration mode of the NOx absorbing catalyst for a time period T1; sensing or detecting a NOx value by the NOx sensor after the performing of the first regeneration mode; determining a time period T2 for performing a second regeneration mode in a predetermined method; performing the second regeneration mode of the NOx absorbing catalyst for the determined time period T2; sensing or detecting a NOx value by the NOx sensor after the performing of the second regeneration mode; determining whether to perform a poisoning recovery mode or not based on the sensed or detected value of the NOx after the performing of the second regeneration mode; and performing the poisoning recovery mode if it is determined that the poisoning recovery mode needs to be performed.

DETAILED DESCRIPTION OF THE EMBODIMENTS

An exemplary embodiment of the present invention will hereinafter be described in detail with reference to the accompanying drawings.

Figure 1:
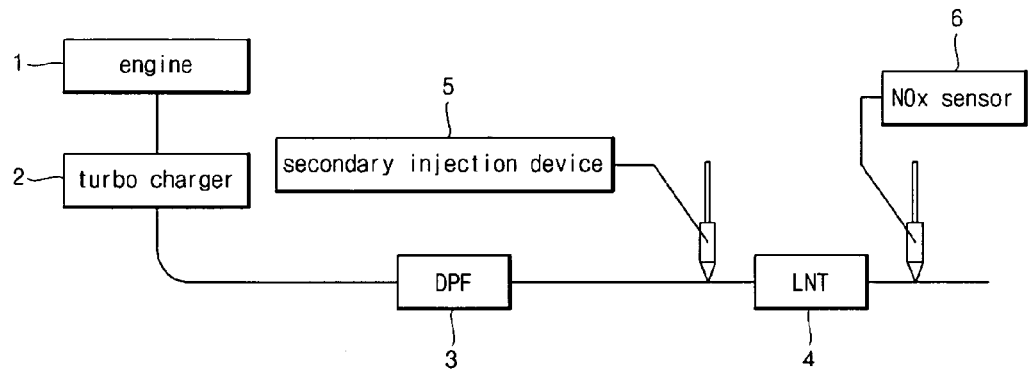
FIG. 1 is a diagram of a NPRS system which performs a method for regenerating a NOx absorbing catalyst according to an embodiment of the present invention.

FIG. 1 is a diagram of an NPRS system which performs a method for regenerating a NOx absorbing catalyst according to an embodiment of the present invention.

Referring to FIG. 1, the NPRS system is arranged in a sequence of an engine 1, a turbo charger 2, a DPF 3, and an LNT (NOx absorbing catalyst) 4. A secondary injection device 5 injects fuel used as a reducing agent in a regeneration of the LNT 4 which is installed upstream of the LNT 4, and a NOx sensor 6 is installed at the downstream of the LNT 4. The secondary injection device 5 and the NOx sensor 6 is connected to a control unit (not shown) to send an electrical signal. The control unit may comprise a processor, memory and associated hardware and software as may be selected and programmed by persons of ordinary skill in the art based on the teachings of the present invention contained herein.

The control unit performs a first NOx regeneration mode and a second NOx regeneration mode using sensed or detected values of the NOx sensor 6 such that an amount of exhausted NOx by the LNT 4 is maintained between a predetermined upper limit UL and a fresh level FL. The fresh level is an amount of exhausted NOx of the NOx absorbing catalyst reduced in a state such that the deterioration by the recovery of poisoning is not called in question.

Figure 2:
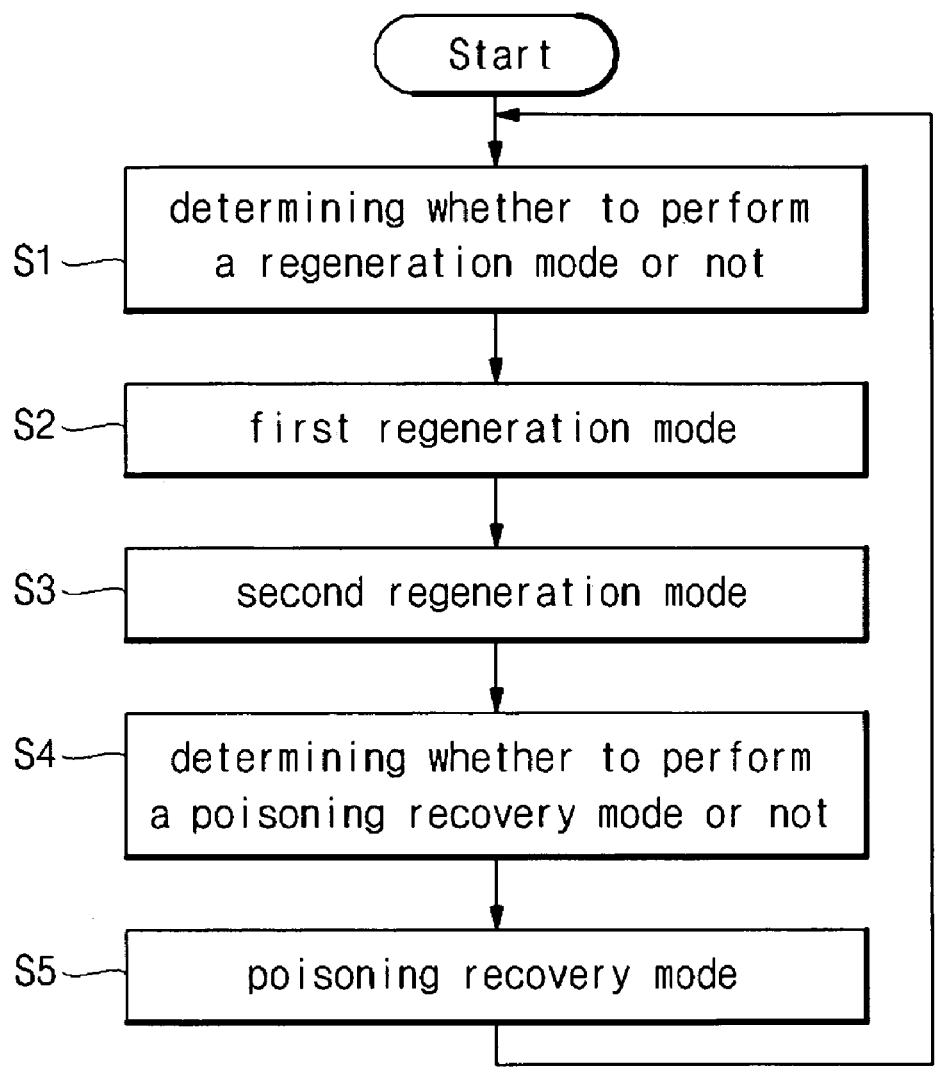
FIG. 2 is a flowchart of a method for regenerating a NOx absorbing catalyst.

FIG. 2 is a flowchart of a method for regenerating a NOx absorbing catalyst according to an embodiment of the present invention. The method for regenerating a NOx absorbing catalyst according to an embodiment of the present invention comprises a regeneration mode performing determination step S1, a first regeneration mode step S2, a second regeneration mode step S3, a poisoning recovery performing determination step S4, and a poisoning recovery mode step S5.

The regeneration mode performing determination step S1 determines whether to perform a regeneration mode or not by sensing or detecting a NOx value in exhaust gas by the NOx sensor and comparing the sensed or detected value to the predetermined upper limit.

The first regeneration mode step S2 performs a regeneration mode for a predetermined time T1 if it is determined that the regeneration mode needs to be performed.

The second regeneration mode step S3 determines a second regeneration mode performing time T2 after performing the first regeneration mode, and repeats the regeneration mode for a determined time.

The poisoning recovery determination step S4 determines whether the performance of the NOx absorbing catalyst has deteriorated based on an amount of exhausted NOx that is sensed or detected after performing the second regeneration mode.

The poisoning recovery mode step S5 performs the poisoning recovery mode if it is determined that the poisoning recovery mode needs to be performed at the poisoning recovery performing determination step S4. Thereby, the poisoning of the NOx absorbing catalyst is removed, and a NOx absorbing performance (i.e. an exhaust gas purification performance) is recovered.

Figure 3:
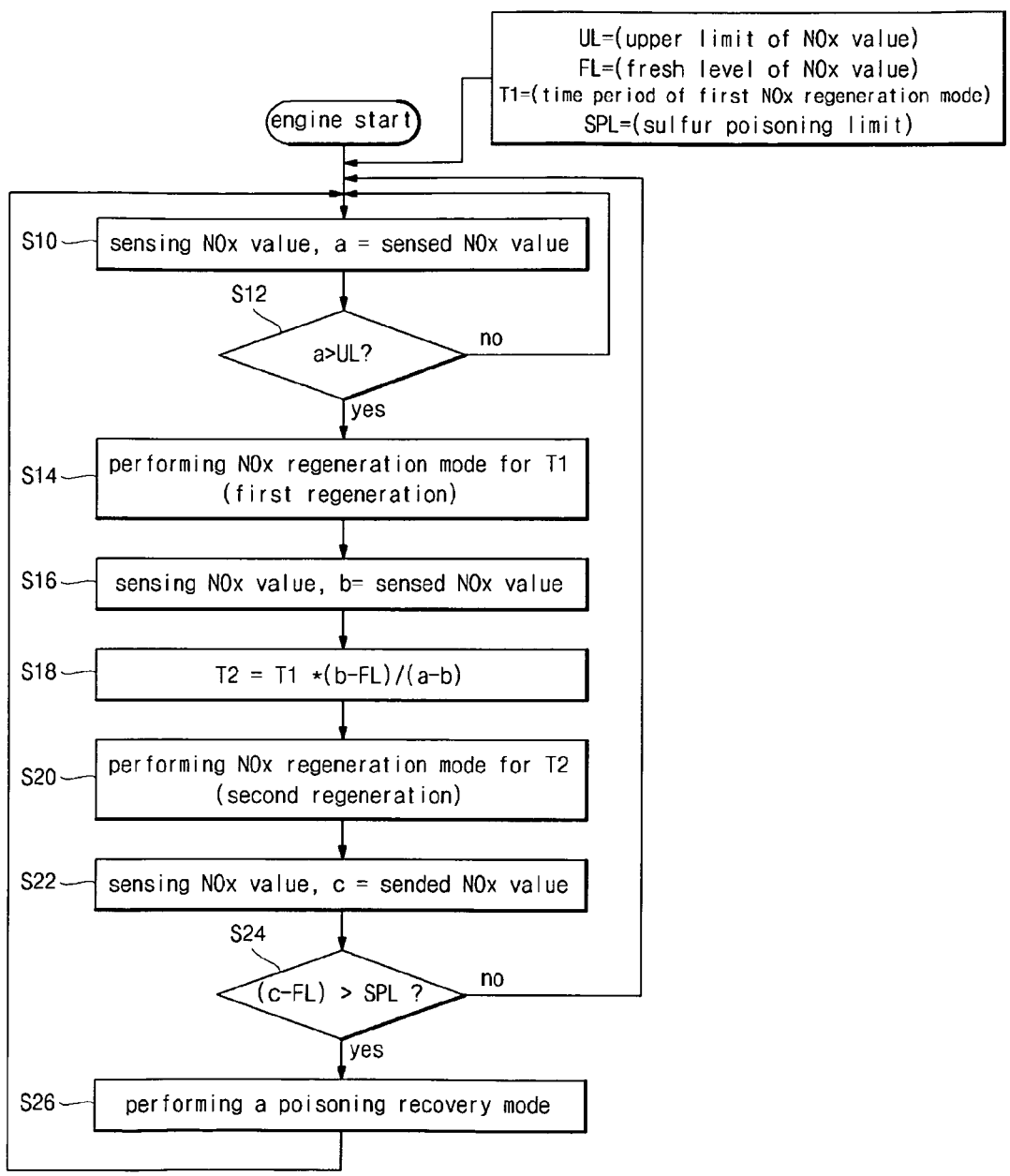
FIG. 3 is a flowchart describing in further detail the method for regenerating a NOx absorbing catalyst according to an embodiment of the present invention shown in FIG. 2.

FIG. 3 is a flowchart describing in more detail the method for regenerating a NOx absorbing catalyst according to an embodiment of the present invention shown in FIG. 2.

Referring to FIG. 3, a method for regenerating a NOx absorbing catalyst according to an embodiment of the present invention begins when an engine start is performed. When the engine has started, a first sensing step S10 senses or detects a NOx value using a NOx sensor. After step S10, a regeneration mode performs a determination step S12 in determining whether to perform the regeneration mode based on the sensed or detected value of the first sensed or detected step. If a regeneration mode needs to be performed, a first regeneration mode step S14 is performed for a predetermined T1. After the first regeneration mode is performed, a second sensing or detecting step S16 which senses a NOx value using the NOx sensor is performed. After a second regeneration mode time determination step S18 of determining a performing time period T2 of the second regeneration mode, a second regeneration mode step S20 of regenerating the NOx catalyst for the performing time period T2, a third sensing step S22 which senses a NOx value using the NOx sensor after performing the second regeneration mode, a poisoning recovery mode performing determination step S24 of determining whether to perform the poisoning recovery mode or not based on the sensed value of the third sensing step, and a poisoning recovery mode step S26.

The first sensing step S10 is performed when an engine start is performed, and the NOx sensor 6 detects a NOx value and then sends the sensed value a to the control unit.

At the regeneration mode performing determination step S12, the control unit compares the sensed value detected in the first sensing step to an upper limit UL set as a comparison criterion, and determines whether to perform the regeneration mode based on the comparison. The upper limit UL is set as an allowable NOx limit value of exhaust gas having passed the NOx absorbing catalyst. If the sensed value a is greater than the upper limit UL, it may be determined that the purification efficiency of the NOx absorbing catalyst has reached the allowable limit by an increase of the absorbed NOx. Accordingly, if it is determined that the sensed value a is not greater than the upper limit UL at step S12, the NOx sensing step is repeated at step S10. On the other hand, if it is determined that the sensed value a is greater than the upper limit UL at step S12, the regeneration mode for regenerating the NOx absorbing catalyst is in order.

At the first regeneration mode step S14, the NOx regeneration mode is performed for the time period T1 while an injection is performed by the secondary injection device 5. The time period T1 is a predetermined value as a criterion time period in the control unit.

At the second sensing step S16, the NOx value is again sensed or detected by the NOx sensor 6 after performing the first regeneration mode. The NOx sensor 6 senses the NOx value and provides the sensed value b to the control unit.

After obtaining the sensed value b, the second regeneration time period T2 is determined using the sensed values a and b, the predetermined upper limit UL, and a fresh level FL. The second regeneration time period T2 can be calculated as shown in the following equation:

$$T2=T1*(b-FL)/(a-b)$$

where a is the first sensed value, b is the second sensed value, T1 is the time period for performing the first regeneration mode, and FL is the predetermined fresh level.

At the second regeneration mode step S20, the NOx regeneration mode is performed for the time period T2.

At the third sensing step S22, the NOx value is again sensed by the NOx sensor 6. The NOx sensor 6 senses the NOx value and provides the sensed value c to the control unit.

At the poisoning recovery mode performing determination step S24, whether to perform the poisoning recovery mode or not is determined using the sensed value c, a predetermined determination criterion value SPL (sulfur poisoning limit), and the predetermined fresh level FL is shown in the following equation:

$$(c-FL)>SPL.$$

If it is determined that a difference between the sensed value c and the fresh level FL is greater than the SPL, it means that the NOx absorbing catalyst has not sufficiently regenerated by the second regeneration mode. The NOx absorbing catalyst may absorb sulfur components as well as NOx. If the absorbed NOx and sulfur components are accumulated in the NOx absorbing catalyst, the components may deteriorate the performance of the NOx absorbing catalyst. Accordingly, if the NOx absorbing performance of the NOx absorbing catalyst has not increased to a predetermined level in spite of performing the second regeneration mode for the time period T2, it may be determined that the NOx absorbing catalyst has been poisoned by sulfur components.

Accordingly, if it is determined that the NOx absorbing performance of the NOx absorbing catalyst has been recovered to a predetermined level by the performing of the second regeneration mode for the time period T2 at step S24, (i.e., if it is determined that the difference between the sensed value c and the fresh level FL is not greater than the SPL at step S24), the control step proceeds to the step S10 thereby again performing the first sensing step. On the other hand, if it is determined that the NOx absorbing performance of the NOx absorbing catalyst has been not recovered to a predetermined level by performing of the second regeneration mode for the time period T2 at step S24 (i.e., if it is determined that the difference between the sensed value c and the fresh level FL is greater than the SPL at step S24), it is determined that the poisoning recovery mode needs to be performed.

If it is determined that the poisoning recovery more needs to be performed, the poisoning recovery mode for the NOx absorbing catalyst is performed at step S26.

Figure 4:
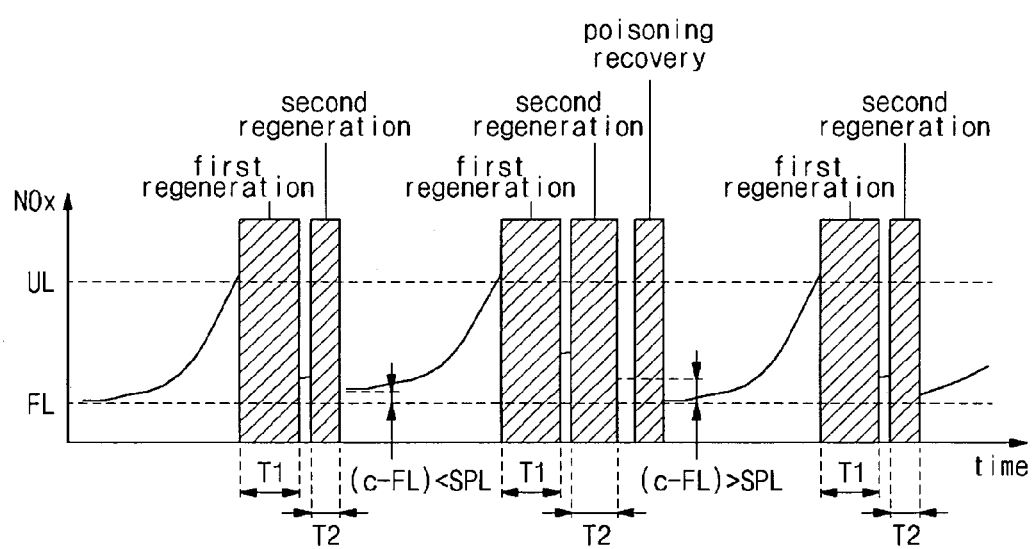
FIG. 4 is a graph showing sensed values of a NOx sensor according to a method for regenerating a NOx absorbing catalyst.

FIG. 4 is a graph showing sensed values of a NOx sensor according to a method for regenerating a NOx absorbing catalyst according to an embodiment of the present invention.

As shown in FIG. 4, the NOx absorbing performance of the NOx absorbing catalyst has been recovered to the predetermined level by performing the second regeneration mode in a region (a), so the poisoning recovery mode has not been performed. On the other hand, the NOx absorbing performance of the NOx absorbing catalyst has not been recovered to the predetermined level in spite of the performing of the second regeneration mode in a region (b), so the poisoning recovery mode has been performed.

The NOx value of exhaust gas having passed the NOx absorbing catalyst can always be regulated between the upper limit UL and the fresh level FL by the NOx control described above. That is, it becomes possible to limit an amount of exhausted NOx within a specific range. Furthermore, since the poisoning mode is performed when the performance of the NOx absorbing catalyst deteriorates, the poisoning recovery control can be performed, and an increase of an amount of exhausted NOx can be prevented.

As described above, a method for regenerating a NOx absorbing catalyst according to an embodiment of the present invention maintains the performance of the NOx absorbing catalyst, thereby limiting an amount of exhausted NOx between the upper limit and the fresh level. In addition, in a method for regenerating a NOx absorbing catalyst according to an embodiment of the present invention, since only one NOx sensor is used, a system can be simplified and the performance of the NOx absorbing catalyst can be more effectively controlled. Furthermore, since the poisoning recovery of the NOx absorbing catalyst is performed efficiently, the deterioration of the performance of the NOx and an increase of an amount of exhausted NOx because of the poisoning can be prevented. Accordingly, the performance and the efficiency of the NOx absorbing catalyst can be substantially enhanced.

While this invention has been described in connection with what is presently considered to be practical exemplary embodiments, it is to be understood that the invention is not limited to the disclosed embodiments, but on the contrary, the invention is intended to cover various modifications and equivalent arrangements included within the spirit and scope of the appended claims.

What is claimed is:

1. A method for regenerating a NOx absorbing catalyst, comprising:
   a) detecting a first NOx value in an exhaust gas by a NOx sensor;
   b) determining whether to perform a regeneration mode or not based on a comparison of the detected value and a predetermined upper limit UL;
   c) performing a first regeneration mode of the NOx absorbing catalyst for a predetermined time period T1, if it is determined that the regeneration mode needs to be performed;
   d) detecting a second NOx value by the NOx sensor after the performing of the first regeneration mode;
   e) determining a time period T2 for performing a second regeneration mode in a predetermined method after performing the first regeneration mode;
   f) performing the second regeneration mode of the NOx absorbing catalyst for the determined time period T2;
   g) detecting a third NOx value by the NOx sensor after the performing of the second regeneration mode;
   h) determining whether to perform a poisoning recovery mode or not based on a determination of whether a performance of the NOx absorbing catalyst has been deteriorated using an amount of exhausted NOx detected after the performing of the second regeneration mode; and
   i) performing the poisoning recovery mode if it is determined that the poisoning recovery mode needs to be performed,
   wherein the time period T2 is determined based on the predetermined time period T1 and a difference between amounts of exhausted NOx by the performing of the first regeneration mode,
   wherein the determining of whether to perform the poisoning recovery mode or not determines whether a difference between the third NOx value sensed after the performing of the second regeneration mode and a predetermined fresh level, which is an intended criterion as a result of the performing of the regeneration mode, is greater than a predetermined level SPL and thereby determines whether a performance of the NOx absorbing catalyst has been deteriorated, and wherein the time period T2 is determined as shown in the following equation: $T2=T1*(b-FL)/(a-b)$, where a is an initial sensed value of NOx, b is a sensed value of NOx after performing the first regeneration, T1 is the predetermined time period, and FL is a predetermined fresh level.

* * * * *